W. VANMANEN.
ROLLER BEARING.
APPLICATION FILED JUNE 5, 1907.
943,128.
Patented Dec. 14, 1909.
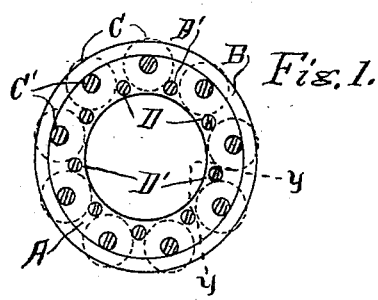
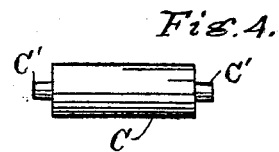
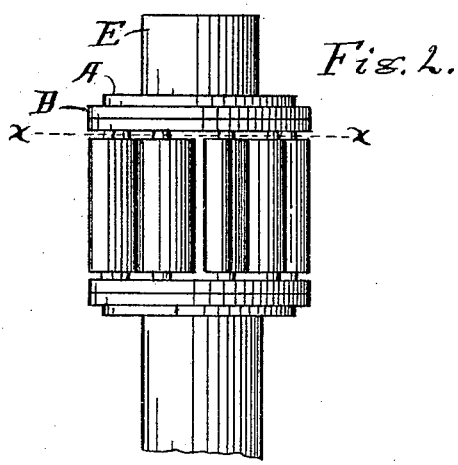
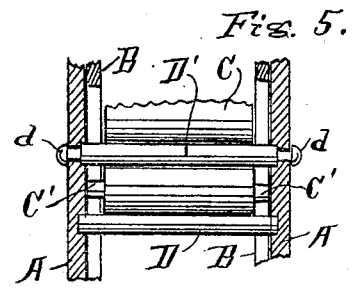
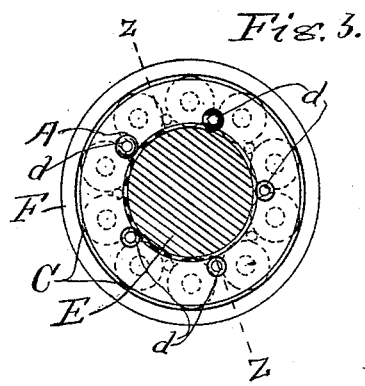
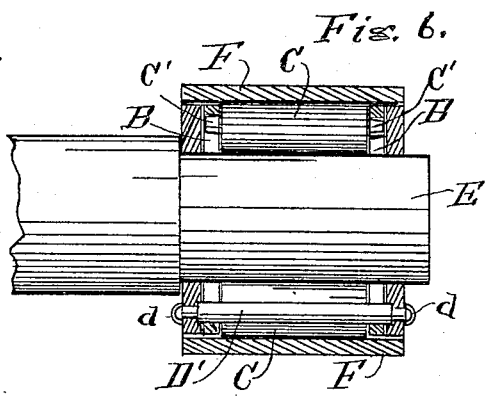
Witnesses
Inventor
William Vanmanen

UNITED STATES PATENT OFFICE.

WILLIAM VANMANEN, OF GRAND RAPIDS, MICHIGAN.

ROLLER-BEARING.

943,128.  Specification of Letters Patent.  Patented Dec. 14, 1909.

Application filed June 5, 1907. Serial No. 377,440.

*To all whom it may concern:*

Be it known that I, WILLIAM VANMANEN, a citizen of the United States, residing at Grand Rapids, in the county of Kent and State of Michigan, have invented certain new and useful Improvements in Roller-Bearings, of which the following is a specification.

My invention relates to improvements in roller bearings for use, particularly, upon freight trucks, shafts, &c., and its objects are: first, to provide a roller bearing with which, while the rollers do not revolve independently of the supports, the effect will be the same as if the rollers were mounted in the supports loosely, and, second, to so mount the rollers in the supports that though the rollers are in direct contact there is comparatively no friction between them. I attain these objects by the mechanism illustrated in the accompanying drawing in which—

Figure 1 is an face view of the inner surface of one end of the supports with the rollers cut off on the line X X of Fig. 2. Fig. 2 is a plan of the rollers and their supports mounted on a shaft. Fig. 3 is a back view of one end of the support. Fig. 4 is a plan of one of the large rollers detached from the supports. Fig. 5 shows the supports cut off practically on the line *y y* of Fig. 1 to illustrate the relative positions of the rollers, and Fig. 6 is a longitudinal section of the device on the line *z z* of Fig. 3.

Similar letters refer to similar parts throughout the several views.

A A are the end supports which are held together preferably, by three of the small rollers, D', passing through them and headed, as at *d*, in such a manner that while they will revolve freely in their bearings, they will hold the ends securely to place. The roller system consists of a series of small rollers, D D' arranged so that the rollers D will turn freely in bearings in the ends A and the rollers D' will secure the ends together, as hereinbefore described, and a series of larger rollers C, having journal bearings formed at the ends as shown at C', so constructed that the rollers and their journal bearings will fit freely, between the end supports when they are supported to position by the rollers D'. These rollers are held to place by means of a ring B at each end which bear upon the outer surface of the journal bearings and hold the rollers C to position so that they will bear, constantly, upon the rollers D and D' so that said rollers will revolve with the rollers C but in the opposite direction so that all friction will be eliminated, so far as is possible with rollers moving in contact, and that, too, without the bearing rollers traveling independently of the direct rotary motion of the supporting frame.

To hold the rollers C to place and, at the same time, insure their free unobstructed movement, as far as possible, I form journal bearings C' at the ends and, after placing them in position over the rollers D, I place a ring B over the bearings C' at each end of the rollers, before securing the end supports A with the rollers D', as hereinbefore described, and then secure the supporting frame with all the rollers in position and the encircling rings B so adjusted that the rollers C will work free of friction upon the rollers D, the rollers being loosely mounted, as indicated in the drawing, so that said rings are made to travel with the motion of the rollers. By this arrangement, it will be readily seen, the rollers C will have a bearing both upon the shaft E and the hub F, or any other outer bearing that may be used, and being loosely mounted between the rings B on the journal bearings C', and the surfaces of the rollers D and D', with the last named rollers free to revolve, practically without friction. The action of the rollers C is practically the same as if they were simply supported between the two bearings E and F, in the usual manner of constructing roller bearings, with the advantage that there is not, in this instance, an excessive friction produced by the reverse motion of the two surfaces of rollers revolving in the same direction with no intervening roller between them that is made to revolve wholly by the motion of the larger rollers without bearing upon either the inner or the outer bearings E and F, or their equivalents. The rings B B may be dispensed with, but if they were it would be necessary to provide some means for holding the rollers C until they were placed in the bearings.

It will be noticed that the journal bearings C' are tapering. This, I find to be one of the most essential features of my invention for the reason that if the rollers become twisted between the shaft or bearing E and the hub or outer bearing F, a common and very damaging trouble with bearings of this class, the tendency of the roller is to force the bearings C' within the ring B that is in advance and force the surface of this ring against the inner surface of the hub F with sufficient force to hold it until the other end of the rollers has advanced so that the rollers lie parallel with the shaft E, when the bearings C' will all adjust themselves and the bearing will again work freely and with the least possible friction. The action of the tapering bearings is so prompt and positive as to render it almost impossible to cramp the wheel or pulley, or in other words, the hub F upon the rollers and shift it so that its motion will not be free and parallel with the movement of the supporting shaft E.

Having thus fully described my invention, what I claim as new, and desire to secure by Letters Patent of the United States, is:

1. In combination with a shaft and hub, end supports mounted on the shaft inside of the hub, a series of small rollers revolubly mounted in the end supports and arranged to secure the end supports together, a series of large rollers mounted alternately with the small rollers, there being tapering bearings at the ends of the large rollers, and supporting rings mounted between the end supports and the ends of the large rollers outside of the tapering bearings.

2. In combination with a shaft and a hub, end supports supported on the shaft within the hub, a series of small rollers revolubly mounted in the end supports and arranged to secure the end supports in position, a series of large rollers mounted alternately with the small rollers between the end supports and having journal bearings, and rings loosely mounted between the end supports and the ends of the large rollers and encircling the journal bearings.

3. In combination with a shaft and a hub, end supports loosely mounted on the shaft inside the hub, small rollers mounted to revolve freely in the end supports and to secure the end supports in position, and a series of large rollers mounted between the end supports alternating with the small rollers and arranged to form a roller bearing engaging the shaft and the hub.

Signed at Grand Rapids Michigan June 3, 1907.

WILLIAM VANMANEN.

In presence of—
  I. J. CILLEY,
  J. A. CLARK.